United States Patent [19]
Hakomori

[11] Patent Number: 6,139,408
[45] Date of Patent: Oct. 31, 2000

[54] SURFACE GRINDING MACHINE AND CARRIER USED THEREFOR

[76] Inventor: Shunji Hakomori, 4-22-16, Shimomeguro, Meguro-ku, Tokyo, Japan

[21] Appl. No.: 09/270,364

[22] Filed: Mar. 16, 1999

[30] Foreign Application Priority Data

Mar. 20, 1998 [JP] Japan ................................. 10-092363

[51] Int. Cl.⁷ ..................................................... B24B 7/22
[52] U.S. Cl. .......................... 451/267; 451/269; 451/285; 451/288; 451/339; 451/398
[58] Field of Search .............................. 451/41, 285, 287, 451/288, 262, 385, 397, 267–269, 398, 339, 2, 201

[56] References Cited

U.S. PATENT DOCUMENTS

| | | |
|---|---|---|
| 5,094,037 | 3/1992 | Hakomori et al. ...................... 451/43 |
| 5,174,067 | 12/1992 | Hasegawa et al. ...................... 451/339 |
| 5,333,413 | 8/1994 | Hashimoto .............................. 451/339 |
| 5,647,789 | 7/1997 | Kitta et al. ............................... 451/41 |
| 5,660,581 | 8/1997 | Shin et al. ............................... 451/289 |
| 5,679,055 | 10/1997 | Greene et al. ............................ 451/41 |

*Primary Examiner*—Eileen P. Morgan
*Attorney, Agent, or Firm*—Snell & Wilmer, L.L.P.

[57] ABSTRACT

In order to take a ground work W out of a work-holding hole of a carrier by chucking the outer periphery of the work W, a surface grinding machine is provided with chucking means for chucking the outer periphery of the work W by a plurality of claw members and a plurality of cutouts into which the claw members of the chucking means can be inserted are made in the edge of the work-holding hole of the carrier, and the ground work W in the work-holding hole is taken out at the position of the cutouts.

8 Claims, 2 Drawing Sheets

SURFACE GRINDING MACHINE AND CARRIER USED THEREFOR

FIELD OF THE INVENTION

The present invention relates to a surface grinding machine for grinding a disc-shaped work such as semiconductor wafer and magnetic disc substrate, and a work-holding carrier used therefor.

DESCRIPTION OF THE RELATED ART

A surface grinding machine such as lapping machine, polishing machine, etc. is provided with a sun gear and an internal gear which are concentrically arranged, as well as an upper surface plate and a lower surface plate, and grinds both surfaces of a work held by a carrier by the upper and lower surface plates, the carrier being engaged with both the gears and moving like a planet.

In the surface grinding machine like this, in general, when the ground work is taken out of the work-holding hole of the carrier, the work is sucked by chucking means of vacuum chuck type.

However, a method of using the vacuum chuck like this often produces stain or dirt on the surface of the ground work and is apt to deteriorate the quality of the work.

SUMMARY OF THE INVENTION

It is a technical object of the present invention to provide means for taking a ground work out of the work-holding hole of a carrier without producing stain or dirt on the surface of the ground work.

To achieve the object described above, the present invention provides a surface grinding machine comprising: a sun gear positioned at the center; an internal gear surrounding the sun gear; a plurality of carriers each of which holds a work and is engaged with both the sun gear and the internal gear and revolves around the sun gear like a planet; an upper and a lower surface plate which sandwich the work held in the work-holding hole of the carrier and grind the work; and at least one chucking means for taking the ground work out of the work-holding hole of the carrier, wherein the chucking means is provided with a plurality of opening/closing claw members for chucking the outer periphery of the work and a plurality of cutouts into which the claw members of the chucking means are inserted and retained by the outer periphery of the work are made in the edge of the work-holding hole of the carrier.

According to the present invention having the constitution described above, since the plurality of cutouts into which the claw members of the chucking means can be inserted are made in the edge of the work-holding hole of the carrier and the work is taken out by chucking the outer periphery thereof with the use of the cutouts, the ground work can be taken out without producing stain or dirt on the surface of the ground work unlike the case in which the work is chucked by vacuum.

According to the preferred embodiment of the present invention, each claw member of each chucking means has a bottom end projected and pointed inward and the bottom end is inserted under the bottom surface of the work to lift the work.

In the present invention, it is preferable that the surface grinding machine is provided with liquid supply means for supplying liquid into the workholding hole to float the work.

In the present invention, it is preferable that a plurality of chucking means correspond to the plurality of carriers individually.

Further, the present invention provides a carrier comprising a gear part engaged with a sun gear and an internal gear in a surface grinding machine and at least one work-holding hole for receiving a work to be ground, the work-holding hole having a plurality of cutouts into which claw members of chucking means for chucking the outer periphery of the work are inserted in the edge thereof.

In the present invention, it is preferable that the carrier has a plurality of work-holding holes and that a plurality of cutouts are made in the edge of each work-holding hole such that they are in the same position in relation to each other with respect to the center of the carrier.

DESCRIPTION OF THE PREFERRED EMBODIMENTS

Figure 1:
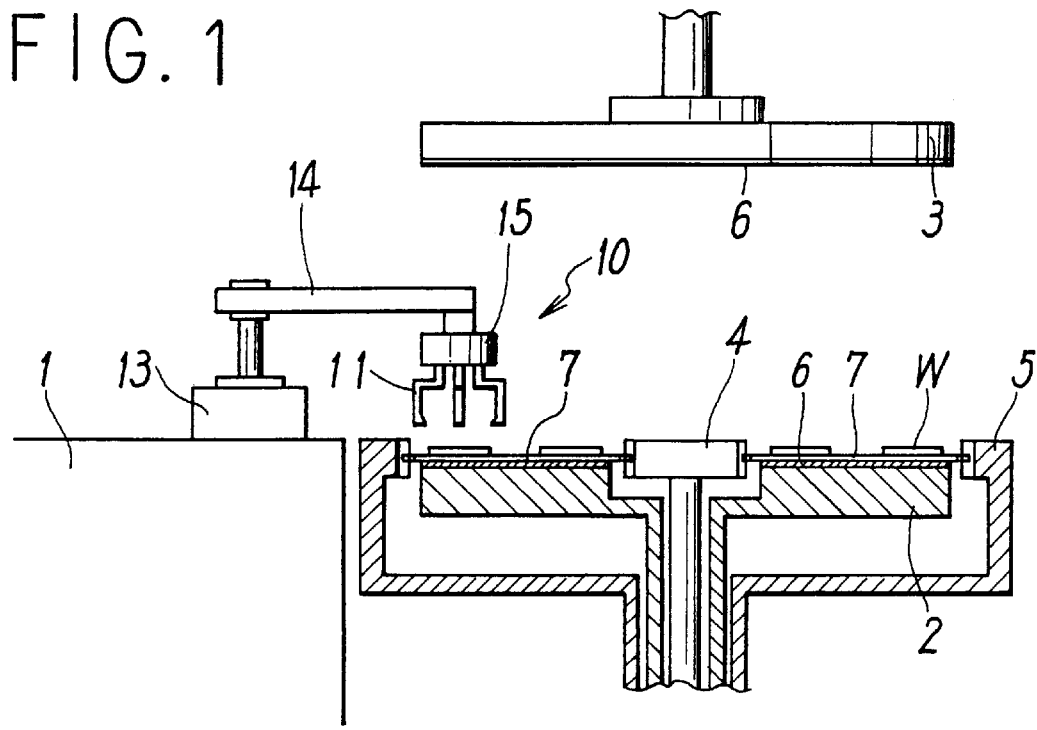
FIG. 1 is a cross-sectional view showing one preferred embodiment of a surface grinding machine according to the present invention.

FIG. 1 is a cross-sectional view showing one preferred embodiment according to the present invention. A numeral 1 designates a machine body, a numeral 2 designates a lower surface plate rotatably disposed above the machine body 1, a numeral 3 designates a rotary upper surface plate disposed above the lower surface plate 2 and moved up and down by an air cylinder (not shown), a numeral 4 designates a sun gear rotatably disposed at the center of the lower surface plate 2, and a numeral 5 designates an internal gear rotatably disposed at the position which surrounds the lower surface plate 2. Both these surface plates 2 and 3 and both the gears 4 and 5 are connected to a motor (not shown) via a transmission mechanism and are rotated in a predetermined direction at a predetermined speed.

Figure 2:
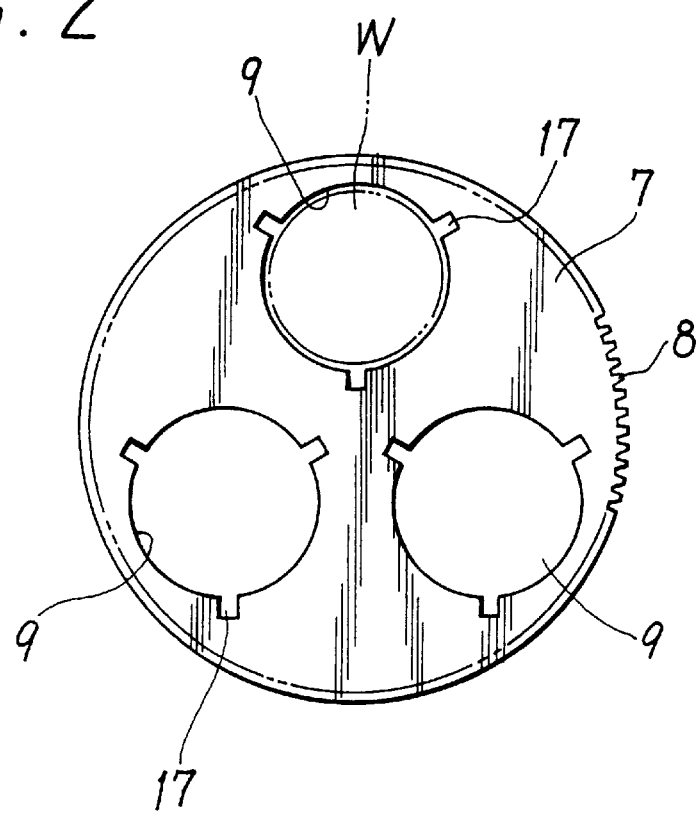
FIG. 2 is a plan view of a carrier.
Figure 3:
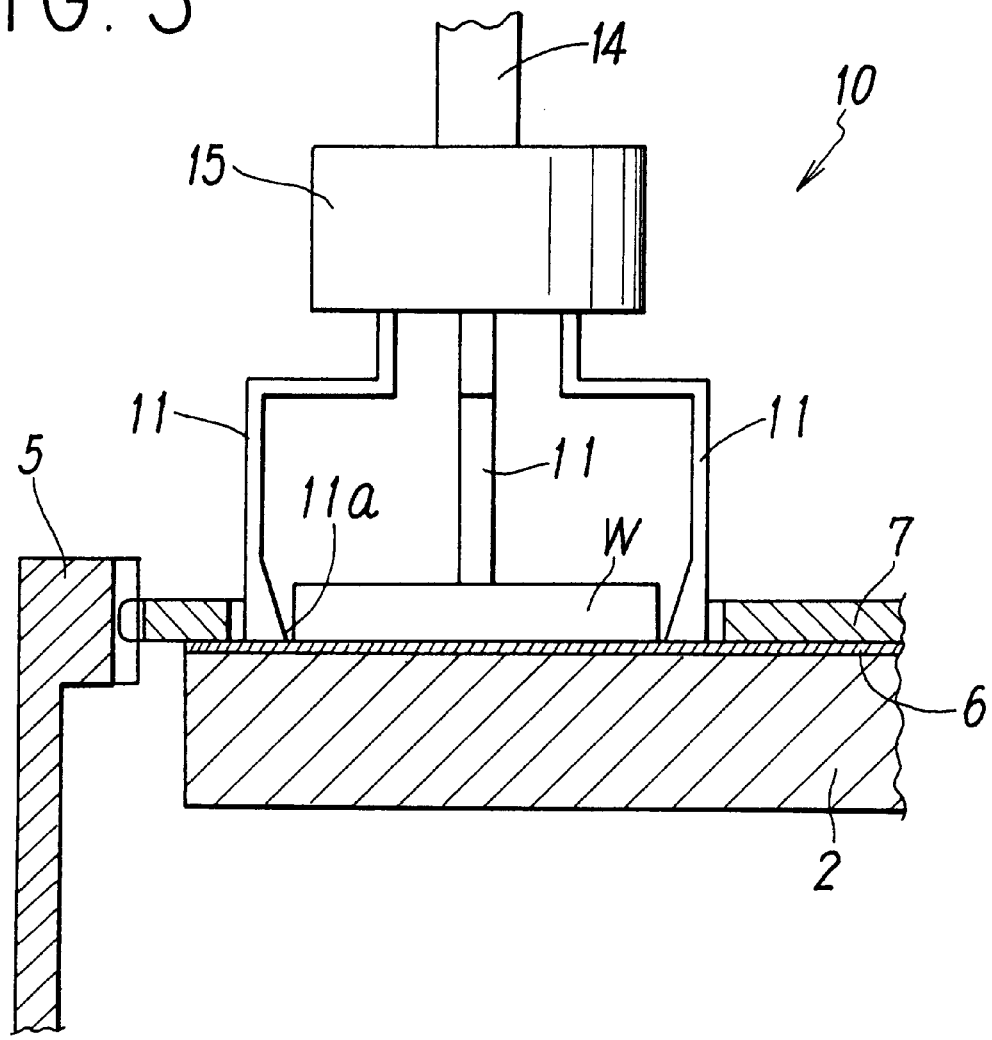
FIG. 3 is an enlarged view of a main part in FIG. 1 in a state in which a work is being taken out.

A plurality of carriers 7 for holding a work W to be ground are arranged on the lower surface plate 2 at equal intervals. The carrier 7, as is evident from FIG. 2 and FIG. 3, are engaged with both the gears 4 and 5 at a gear part 8 on the outer periphery thereof and revolves around the sun gear 4 while rotating with the rotation of both the gears 4 and 5, that is, moves like a planet. The carrier 7 has one or a plurality of circular work-holding holes 9 for holding the work W shaped like a disc and the work W held in the work-holding hole 9 is ground by the upper and lower surface plates 2 and 3. A grinding pad 6 is placed on the surface of each of the upper and lower surface plates 2 and 3.

The machine body 1 is provided with chucking means 10 for taking the ground work W out of the work-holding hole 9 of the carrier 7 at the position adjacent to the lower surface plate 2. The chucking means 10 chucks the outer periphery of the work W by a plurality of claw members 11 (three claw members shown in the embodiment) and has a chucking head 15 at the top end of a chucking arm 14 supported by a support mechanism 13 such that it can be moved up and down and be turned, and the claw members 11 are mounted to the chuck head 15 such that they can be freely opened and closed by an actuator such as an air cylinder, etc.

The bottom end 11a of each claw member 11 is pointed inward and compresses the grinding pad 6 slightly and enters under the work W to retain the work W.

In this respect, although FIG. 1 shows a state in which the chucking means 10 is moved to the chucking position of the work W, when the upper surface plate 3 is lowered to grind the work W, as a matter of course, the chucking arm 14 of the chucking means 10 is turned to the position which does not interfere with the operation.

On the other hand, a plurality of cutouts 17 into which the claw members 11 of the chucking means 10 are inserted are made in the edge of each work-holding hole 9 of the carrier 7, and the claw members 11 chuck the outer periphery of the work W at the positions of the cutouts 17. The cutouts 17 are made in each work-holding hole 9 such that they are in the same position in relation to each other with respect to the center of the carrier.

The chucking means 10 is provided at the position corresponding to each carrier 7 on a one-by-one base, and when the work W is taken out, while the carrier 7 is being only rotated intermittently by a predetermined angle at the position by the sun gear 4 and the internal gear 5, the chucking means 10 takes the work W turned to the taking-out position corresponding to the chucking means 10 out of the work-holding hole 9.

In the surface grinding machine having the constitution described above, an unprocessed work W held in the work-holding hole 9 of each carrier 7 is ground in the same way as in a known surface grinding machine. That is, when the unprocessed work W is supplied in the work-holding hole 9 of each carrier 7 by suitable loading means (not shown), the upper surface plate 3 is lowered from the position shown in FIG. 1 and both the gears 4 and 5 and both the surface plates 2 and 3 are rotated, and the upper and lower surfaces of the work W held by the carrier 7 revolving around the sun gear 4 like a planet are ground by the upper and lower surface plates 2 and 3.

When grinding is finished, both the gears 4 and 5 and both the surface plates 2 and 3 are stopped and, as shown in FIG. 1, the upper surface plate 3 is moved up to a waiting position and the chucking means 10 is turned to a chucking position and takes the ground work W out of each carrier 7. At this time, the work W turned to the taking-out position is taken out of the work-holding hole 9 one by one by rotating the carrier 7 intermittently by a predetermined angle at the position by controlling the number of revolutions and the rotational direction of the sun gear 4 and the internal gear 5.

When the work W is taken out, as shown in FIG. 3, each claw member 11 is inserted into the cutout 17 and the top end 11a thereof is put under the work W to retain the outer periphery of the work W and the work W is lifted in that state. At this time, if the work-holding hole 9 is filled with liquid such as pure water, etc. through the claw members 11 or the other nozzles and the work W is floated by the liquid, each claw member 11 can easily chuck the outer periphery of the work W.

As described above, simply by making the cutouts 17 in the edge of the work-holding hole 9 of the carrier 7, the ground work W can be taken out of the carrier 7 without producing a suction scar on the surface thereof as is often the case in which the work W is sucked by a vacuum chuck.

Although a same number of chucking means 10 as the carrier 7 are provided at the position corresponding to each carrier 7 in the preferred embodiment shown in the drawing, it is also recommended that only one chucking means 10 be provided and the carrier 7 be moved one by one to the chucking means 10 to take out the work W.

Further, although a carrier having three work-holding holes 9 has been described, as a matter of course, the number of the work-holding holes 9 may be one, two, or four or more.

In this respect, the chucking means 10 can be used not only as unloading means for taking out the unprocessed work as described above but also as loading means for loading the unprocessed work into the carrier 7. However, another loading means of vacuum chucking type may be provided because a suction scar on the surface of the yet-to-be-ground work does not present a significant problem.

As described above, according to the present invention, simply by making the cutouts in the edge of the work-holding hole of the carrier, the groundwork W can be taken out of the carrier without producing a suction scar on the surface thereof as is often the case in which the work W is sucked by a vacuum chuck.

What is claimed is:

1. A surface grinding machine comprising:

a sun gear;

an internal gear concentrically surrounding said sun gear;

a plurality of carriers each having a hole formed therein configured to hold a work and having an upper surface and a lower surface, wherein said each of said plurality of carriers is engaged with both said sun gear and said internal gear and revolves around said sun gear;

an upper surface plate disposed adjacent to said upper surface of said work and configured to grind said upper surface of said work and a lower surface plate disposed adjacent to said lower surface of said work and configured to grind said lower surface of said work; and at least one chucking means for retrieving said work from said hole of said carrier, wherein said chucking means is provided with a plurality of opening/closing claw members for chucking the outer periphery of said work and wherein said carrier comprises a plurality of edge cutouts formed therein and disposed adjacent said hole into which said claw members of said chucking means are inserted to retain the outer periphery of said work.

2. The surface grinding machine as claimed in claim 1, wherein a plurality of chucking means correspond to said plurality of carriers individually.

3. The surface grinding machine as claimed in claim 1, wherein each claw member of said chucking means has a bottom end projected and pointed inward, the bottom end being inserted under the bottom surface of the work to lift the work.

4. The surface grinding machine as claimed in claim 2, wherein each claw member of each of said chucking means has a bottom end projected and pointed inward, the bottom end being inserted under the bottom surface of the work to lift the work.

5. The surface grinding machine as claimed in claim 3, further comprising liquid supply means for supplying liquid into the work-holding hole to float the work.

6. The surface grinding machine as claimed in claim 4, further comprising liquid supply means for supplying liquid into the work-holding hole to float the work.

7. A carrier comprising: a gear part engaged with a sun gear and an internal gear in a surface grinding machine; and at least one work-holding hole for receiving a work to be ground, said work-holding hole having a plurality of cutouts in the edge thereof into which claw members of chucking means for chucking the outer periphery of the work are inserted.

8. The carrier as claimed in claim 7, wherein said carrier has a plurality of work-holding holes and a plurality of cutouts are made in the edge of each work-holding hole such that they are in the same position in relation to each other with respect to the center of the carrier.

* * * * *